United States Patent [19]

Holzhausen et al.

[11] Patent Number: 4,659,117

[45] Date of Patent: Apr. 21, 1987

[54] FLEXIBLE COUPLING FOR PIPES IN EXHAUST SYSTEMS OF MOTOR VEHICLES

[75] Inventors: Wieland Holzhausen, Auerbach; Kurt Albecker, Rheinstetten-Forchheim, both of Fed. Rep. of Germany

[73] Assignee: IWK Regler und Kompensatoren GmbH, Fed. Rep. of Germany

[21] Appl. No.: 517,694

[22] Filed: Jul. 27, 1983

[30] Foreign Application Priority Data

Aug. 10, 1982 [DE] Fed. Rep. of Germany ... 8222490[U]
Jun. 14, 1983 [DE] Fed. Rep. of Germany ....... 3321382

[51] Int. Cl.4 .............................................. F16L 55/02
[52] U.S. Cl. ..................................... 285/49; 285/226; 285/299; 285/301; 181/208; 181/252; 180/309
[58] Field of Search ................. 285/49, 226, 300, 301, 285/299, 114, 227, 229, 298, 301, 302; 181/207, 208, 277, 252; 188/268; 180/309

[56] References Cited

U.S. PATENT DOCUMENTS

| | | | |
|---|---|---|---|
| 1,923,124 | 8/1933 | Stanley | 285/229 |
| 2,712,456 | 7/1955 | McCreery | 285/353 |
| 2,771,311 | 11/1956 | Hottenroth | 285/353 |
| 2,775,445 | 12/1956 | Goodloe | 188/268 |
| 3,000,389 | 9/1961 | Alsager et al. | 285/49 |
| 3,061,039 | 10/1962 | Peters | 285/229 |
| 3,420,553 | 1/1969 | Poxon et al. | 285/49 |
| 3,985,378 | 10/1976 | Muller | 285/49 |
| 4,090,726 | 5/1978 | Mischel | 285/229 |
| 4,209,177 | 6/1980 | Hall | 285/368 |
| 4,523,612 | 6/1985 | Kuklo | 181/207 |

FOREIGN PATENT DOCUMENTS

| | | | |
|---|---|---|---|
| 667144 | 11/1938 | Fed. Rep. of Germany | 285/114 |
| 1675302 | 12/1970 | Fed. Rep. of Germany | 285/49 |
| 2808135 | 8/1979 | Fed. Rep. of Germany | 285/226 |
| 2838990 | 3/1980 | Fed. Rep. of Germany . | |
| 2927639 | 1/1981 | Fed. Rep. of Germany | 285/229 |
| 2418333 | 10/1979 | France | 285/226 |
| 118348 | 7/1983 | Japan | 181/208 |
| 168372 | 8/1921 | United Kingdom | 285/227 |
| 958760 | 9/1982 | U.S.S.R. | 285/227 |

Primary Examiner—Richard J. Scanlan, Jr.
Assistant Examiner—Eric K. Nicholson
Attorney, Agent, or Firm—Antonelli, Terry & Wands

[57] ABSTRACT

For decoupling an exhaust system while suppressing or damping motion and cutting down noise as far as possible, a flexible joint or articulation for the exhaust system of a motor vehicle has a flexible duct part with support parts joined with its ends for outer damping members. The flexible duct part is so designed that the support parts are overlapped on the outer side of the duct part forming pockets acting as housings for compacts of compressed metal wire for damping motion of the support parts in relation to each other.

20 Claims, 16 Drawing Figures

FLEXIBLE COUPLING FOR PIPES IN EXHAUST SYSTEMS OF MOTOR VEHICLES

BACKGROUND OF THE INVENTION

The present invention relates to a coupling for flexibly joining pipe parts together in the exhaust systems of motor vehicles, with the coupling including at least one flexible pipe part such as a corrugated pipe, a metal hose or the like, having support parts, joining the ends of the flexible parts, for damping members placed around an outside of the coupling.

A coupling for joining two pipes at an exhaust outlet of the engine and the exhaust system of a motor vehicle is proposed in Offenlegungsschrift No. 2,838,990. Such coupling makes it possible to provide a large degree of relative motion between the engine and the exhaust gas system thereby increasing the life of the exhaust system. In the known coupling, two connection flanges, placed at the connection ends of a single flexible pipe or of an interlocking strip pipe, have bolts extending therethrough and are clamped by the same using a spring element.

A disadvantage of the above proposed coupling resides in the fact that the design is generally complex, and for this reason, likely to be damaged. A further disadvantage resides in the fact that although, in this known design, relative motion of the engine and of the exhaust system may be taken up, because, by virtue of the arrangement of the spring elements, the spring elements are not decoupled so that vibrations of the engine may well be transmitted to the exhaust system where they may cause noise and an overly high rate of wear. Although it has been suggested to propose additional damping members, possibly combined with the spring element, this would be only an attempt at using the theoretical purely resilient damping properties of a spring. Because of the use of a spring element, with its resilient and resonant properties, in this system when an attempt at cutting out such properties by the use of friction acting on the element, it is not possible to achieve a decoupling effect and there is no question of the best possible suppression of the noise made by the exhaust system.

The aim underlying the present invention resides in providing a simple, sturdy and trouble-free unit for flexibly joining pipe parts of an exhaust system of a motor vehicle.

A further object of the present invention resides in providing a joint means for stopping transmission of the motion of the engine of a motor vehicle to parts of the exhaust system.

A still further object of the present invention resides in ensuring the best possible suppression of exhaust system noise. In accordance with advantageous features of the present invention, a joint or coupling system is provided wherein the support parts are placed so as to overlap each other on an outer side of the pipe part, with the parts forming housing-like pockets that may be moved relative to each other, which pockets have damping cushions of pressed metal wire.

By virtue of the present invention, it is possible to eliminate the use of a spring element, in the true or more limited sense of the word, and to use a highly effective conventional damping cushion which has so far only been used for other purposes. More particularly, by virtue of the features of the present invention, it is possible to provide a damping cushion with the elements thereof made of, for example, a pressed metal wire in the form of a pressed wire cloth, pressed wire grid, randomly pressed wire or the like, which whatever the working condition, when bent out of the normal form, will return to an unstressed position more or less asymptotically after being deformed by the force acting thereon, with the motion into the unstressed condition taking place with little or no resilient effect in the sense of overshooting beyond the unstressed position, that is, after being stressed and released in the opposite direction.

In fact, unlike the case of the true spring, the idea behind the present invention resides in eliminating the use of any spring, as regularly used in the prior art, and using, in place thereof, a special-purpose damping cushion or shock adsorbing pad. Unlike the case of springs such as, for example, spiral springs, such cushions have the useful property of having a highly progressive strain-stress curve. The kinetic or oscillation energy is quickly turned into heat, that is rapidly conducted away because of the high conductivity of the cushion metal, namely, wire, and the air spaces therein. Whereas the exhaust gas will be at a temperature of up to 1100° C., within the damping cushion, the temperature will be at a level of 200°-250° C. so that not even damage to the material by overheating is to be feared.

A further point with this design is that it is possible to do without a complex structure using tightening nuts for keeping bolts, that are able to be moved in relation to the connection pieces, in place. The support parts forming housings on the pockets are in fact more specially all fixedly joined to the ends in question of the flexible pipe part, a useful effect being produced if one part of the support parts is formed by stamping out and bending back parts of a connection pipe sealingly joined with one end of the corrugated pipe. For this reason, the joint system of the present invention may be more readily manufactured, from the point of view of a production engineer, than conventional corrugated joint systems. The decoupling structure of the invention makes use of the best possible selection of different features for meeting the design needs of an exhaust system to be used in a motor vehicle. Its mobility in a low frequency range is great enough even at a high amplitude, while the joint has a powerful damping effect in the acoustic oscillation range in which the amplitude is low. The construction of the present invention makes it possible for lighter exhaust pipe systems and mountings to be used.

The construction of the invention makes it possible, dependent on the needs, for tension, compression, angular and lateral loads on the corrugated pipe to be absorbed. In this case, in preferred forms of the invention, the one or the other damping cushion, placed one after the other in the axial direction, is loaded in an axial direction by a compression force. It is furthermore possible for a damping cushion to simply be placed between two bearers, that may in addition be fixedly joined, as, for example, by welding, bonding or the like, with the support parts, such damping cushion then being additionally capable of being loaded by tension forces.

If desired, it is then possible, within the framework of a further development of the present invention, to have a number of support parts placed one after the other for the damping cushion, with the support parts being rigidly joined, in turn, with one and then with the other end of the pipe part.

To maintain the damping cushions in place, radially, the damping cushions are placed in a housing with housing-like pockets, that are formed by the support parts, with the pockets having bearer faces for the damping cushions. In this case, the design is such that the support parts have generally radially running end faces as bearers for the damping cushions, taking the form of supporting parts placed at the ends in question of the pipe part. It is furthermore possible for at least one end wall of a housing-like pocket for the damping cushion to be formed by a ring part placed on a rod running generally through the middle of the cushion, the rod running freely at least through another support part adjacent thereto. In this respect, the damping cushions have holes in the middle thereof with the rod running therethrough, the rod being fixedly joined to a supporting part. As part of a still further development of the invention, at least one supporting part has a radially running, two-layer cupped part, whose two end faces are in the form of two separate bearer parts.

The alignment of the pocket-forming support parts and the damping cushions seated in them may be in keeping with the main direction of the components of the motion that are to be taken up. It is possible, in order to generally absorb axial motion, for the support parts to have end faces such that lines normal thereto are generally axial for use as bearers for the damping cushions, that are formed at the ends in question of the pipe part.

It is furthermore possible, in place of this, for the support parts to have end faces (so placed that the lines normal thereto are generally radial in direction) designed as supporting parts for the damping cushion, that are formed at the ends in question of the pipe part for the purpose of damping radially directed motions such as angular motion or lateral motion. To the degree that, in addition to damping motion in the main direction of motion in question, forms of motion in other directions are to be absorbed, a changed form of the damping cushion may be used in keeping with the motion to be absorbed or damped. Whereas, in the case of radially symmetrical damping cushions, it is not possible for crossways forces in a plane normal to the main axis of the system to be absorbed, and such forces will only be responsible for a twisting effect, in a preferred form of the invention, the damping cushions are not made radially symmetrical. This makes it possible for crossways or transverse forces to also be absorbed. Motion acting centrally on the damping elements but at the same time in a sideways direction may be absorbed insofar as the end faces of their central part are angled back towards their edges so that more specially between the end faces and the outer faces there will be a right angle. While, on the other hand, the form of the damping cushion may be produced as desired by clamping or pre-stressing after they have been fixed in place in the pockets formed by the support parts, in keeping with a preferred form of the invention, the damping cushions are prestressed into the form of the housing-like pockets. Great trouble is experienced in the case of such exhaust systems for motor vehicles insofar as there is relatively little space on hand near the exhaust system, at least in certain directions. While it is possible, for the damping cushions to be placed radially about the flexible pipe part, the amount of space is frequently not large enough directly over the flexible pipe part, because the flexible pipe part, if in the form of, for example, a bellows, takes up quite a bit of space in the radial direction, inasfar as the waves of the bellows generally have a larger radius than the radius of the pipe parts of the system. It is for this reason that, in keeping with a further form of the invention, the damping cushions are placed next to the flexible pipe part in such a way that they are axially out of line with each other in the axial direction. More particularly, inasfar as the main axis of the normals to the faces of the support parts is radially in direction, it is furthermore possible according to the invention for a support part to have a bridge piece for one of the damping cushions, such bridge piece being seated on the outer face of the flexible pipe part, whereas, the other support part is seated on a part joined with the other end of the flexible pipe part and takes the form of a pipe part running out past the end of the flexible pipe part. Inasfar as twin or double pipe systems are used, the support parts may be placed with the cushions generally linearly in a single plane with the pipe parts next thereto, if there is enough space in this direction but not enough space in the direction at a right angle thereto. If the amounts of space are different, it is however furthermore possible for the support parts with the damping cushions to be placed to the side between the pipe parts so that, in each case, they are placed right over the flexible pipe parts or out of line in an axial direction. As a point the damping cushion does not have to be pre-stressed or to be under a stress when put into position. However, to the degree that such prestressing effect is desired, such stress may be matched or adjusted in the right way. In one form of the invention, a bearer face of one support part may be formed by one threaded washer or disc screwed into a threaded bushing. As part of another possible design, in at least one end face of a support part, there are a number of nose pieces running out symmetrically from the outer edge thereof and, between the end face of the support part and the damping cushion, there are openings equal in number to the number of nose pieces, with the diameter of the openings changing from one opening to the next one and the greatest diameter being generally equal to the outer size of the nose pieces; and the washer may be adjusted from the outside for changing the angular position thereof.

Further details and useful effects of the present invention will be seen from the claims and the account now to be given of working examples thereof using the figures herein.

BRIEF DESCRIPTION OF THE DRAWINGS

FIG. 5a is a cross sectional view of a first embodiment of a twin pipe system with a linear system of bellows and damping cushions with adjustable stressing or clamping force;

FIG. 5b is a view of an adjustment washer used in the embodiment of FIG. 5a;

FIG. 7b is a partially schematic cross sectional view taken along the line VIIb-VIIb in FIG. 7a;

DETAILED DESCRIPTION

Figure 1A:
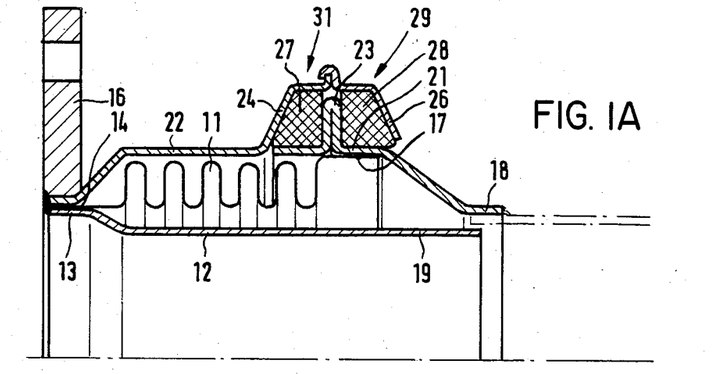
FIGS. 1A and 1B are cross sectional views of a first embodiment of the coupling constructed in accordance with the present invention for producing a flexible joint, together with two possible ways of maintaining the damping cushion or pad in position.
Figure 1B:
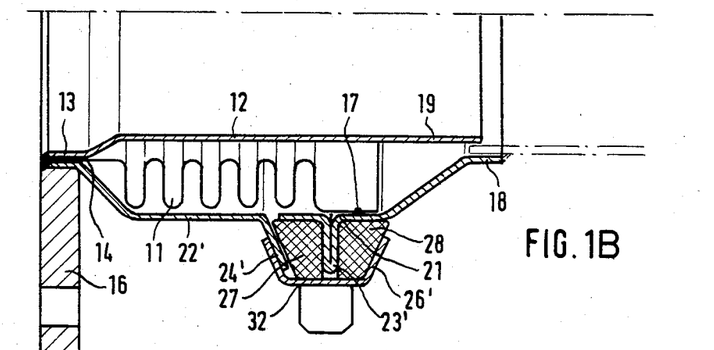

Referring now to the drawings wherein like reference numerals are used throughout the various views to designate like parts and, more particularly, to FIG. 1, according to this figure, a connection between the engine and the exhaust system of a motor vehicle includes a corrugated or bellows pipe 11, forming a flexible pipe or duct part, with the bellows pipe 11 having a barrel 112, one end of which is fixedly joined to a first end 14 of the bellows pipe 11. A connection flange 16, used for forming a connection between the coupling of the present invention where the bellows pipe and an engine (not shown) of the motor vehicle is provided on the end 14, with the other end 17 of the bellows pipe 11 being joined directly with the exhaust system (not shown) of the motor vehicle or, as shown in FIG. 1, indirectly joined by a pipe 18 fixedly joined to the end 17. The outer end 19 of the barrel 12 is placed generally clear of and inside the pipe 18. This construction gives a flexible but gas-tight connection for the flow of exhaust gas from the engine to the exhaust system.

It is to be more specially noted that FIGS. 1A and 1B are to be respectively thought of as sections of axially symmetrical designs or structures. It goes without saying that the structure in FIG. 1A and the structure in FIG. 1B, whose part numbers are, in esch case, primed with a apostrophe, are not used within the same form of the invention and are, in fact, two possible forms thereof that would not be used together.

Tubular supporting parts 21 and 22 are rigidly fixed on the ends 14 and 17 of the bellows pipe 11, by, for example, welding, so that they are pointing towards each other. The supporting parts 21 and 22 have, generally at their end parts furthest from the ends 14 and 17 of the bellows pipe 11, bearers 23, 24 and 26 (FIG. 1A) on support parts for the damping cushions 27 and 28. The bearer 23 is formed on the supporting part 21 by a radially outwardly running two-walled fold of said tubular supporting part. The damping cushions 27 and 28 are placed on the two sides of the bearer 23. The bearer 24 is formed by a sloping, outwardly running bent part, that is to say a cup-like part that becomes wider as a sort of socket, as part of the supporting parts 22 that may, in general, be said to be lined up with the axis of the coupling. The bearer 26 is an inwardly bent part in the form of a sheet metal ring, that, in the radial plane of the bearer 23, is crimped around the supporting part 22 at the bearer. The damping cushion 27 is placed on the bearer 24 and against the one side of the bearer 23. The damping cushion 28 is placed up against the bearer 27 and, on the other side, against the bearer 23. The supporting parts 22, with the bearer 24, the support part 29, with the bearer 26, and the supporting part 21 with its parts, running generally axially, on two sides of the bearer 23 take the form of a housing 29 and 31 or of two housing-like pockets on the two sides of the bearer 23 for the two damping cushions 27 and 28.

As shown in FIG. 1B, the supporting part 22' does not have an axial part of it run over the damping cushion 27 (that is ring-like as well in form) but comes to an end with a coned widening part in the form of a bearer 24'. On this part there is an open sheet metal ring, having a cross section like the cross section of a trough, forming a housing-like support part 32, that in the section will be seen to be trapezoidal, with one side of the trapezium being fixed to the bearer 24' and the other side forming the second bearer 26'. The sheet metal ring is placed over and on the coned, widening part of the left-hand tubular supporting part 22' and the right hand damping cushion 28 and it is fixed in position by way of molded lugs using screws (not shown). The support part 32 and the axial parts of the supporting part 21 in this case as well take the form of housing-like pockets for the damping cushions 27 and 28.

The coupling to be seen in FIGS. 1A and 1B produces a flexible or articulated joint between an engine and an exhaust gas system of a motor vehicle and having the bellows pipe 11 and the piece 18 of the pipe joined to the end thereof, takes the form of a completely fluid-tight duct for the exhaust gas from the engine and, on the other hand, is supported by the pipe supporting parts 21 and 22 and furthermore the supporting parts 21' and 22' together with the support part 32. Because the design thereof has bearers 23, 24 and 26 and furthermore, on the other hand, the bearers 23', 24' and 26' for the damping cushions of pressed metal wire, it is possible to ensure a complete decoupling of the exhaust gas system from the engine and the vibrations thereof and ensure a trouble-free connection cutting out resonant or parasitic vibrations.

In place of the radially symmetrical design as in FIGS. 1A and 1B, it is possible, to have separate damping cushions, that are spaced out more or less evenly around the axis of the flexible pipe parts or bellows pipes 11, with such cushions being specially positioned, as explained more fully hereinbelow, between flange-like parts joined with the ends of the bellows pipe 11.

Figure 2:
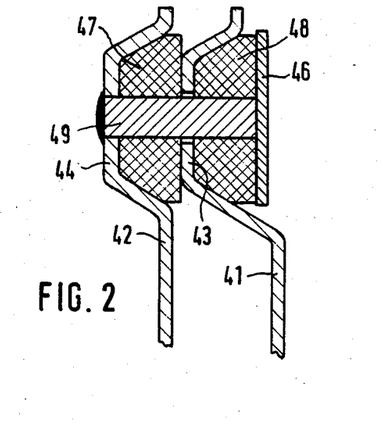
FIG. 2 is a cross sectional view of another embodiment of a coupling in accordance with the present invention.

As shown in FIG. 2, one supporting part 41 is firstly fixed to the end 17, that is, to be joined with the exhaust pipe system (not shown), of the bellows pipe 11 (see FIG. 1), whereas, a further supporting part 42 is fixed to that end 13 of the bellows pipe 11, that is to be joined with the engine. Although there are not details given in this respect in FIG. 2, the supporting parts 41 and 42 may, in fact, have axial parts. At their ends, the supporting parts are again formed to be in agreement with the form of the damping cushions 47 and 48 and are designed as housing-like pockets with bearers 43 and 44 for the damping cushions made of metal wire 47 and 48. The damping cushions 47 and 48, have, like the bearer 43, middle openings, through which a rod 49 is placed and the rod is, on the one hand, fixed, as by welding, to the bearer 44. On the other end of the rod 49, a plate, as a further bearer 46, is fixed. It will be seen from this that the bearers 44 and 46 are indirectly joined with the end 13 of the bellows pipe 11, whereas, the bearer 43 is joined up with the end 17 of the bellows pipe 22. The damping cushions 47 and 48 are, for their part, placed between the bearer 44 and the bearer 43 and, on the other hand, placed between the bearer 43 and the bearer 46 so that there will be a damping effect in both directions of oscillation or shaking. Furthermore, the bearers 44 and 43 are partly placed around the damping portions 47 and 48 like cups or bells forming housings running in an axial direction so that sideways forces are taken up and damped as well. In addition, the damping cushions 47 and 48 are kept in place by the rod 49.

Figure 3:
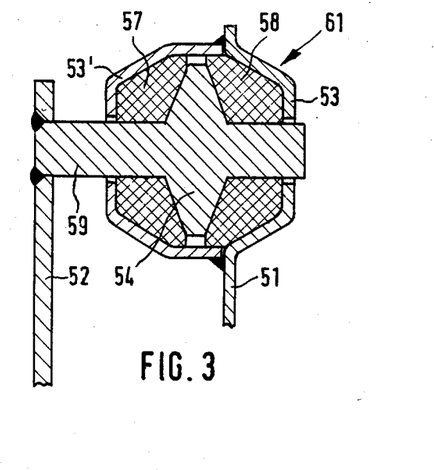
FIG. 3 is a cross sectional view of a part of a further embodiment of a coupling unit of the present invention.

In FIG. 3, the construction is like that of FIG. 2 in as far as the damping cushions, made of metal wire, are placed in a housing 61 with separate pockets, with the housing 61 being formed by bearers 53 and 53' joined with a support part 51 and by way of the same with the end 17 of the bellows pipe 11. Furthermore, the bearer 53 is formed in one piece on the supporting part 51 and the bearer 53' is rigidly joined up with the bearer 53 by, for example, welding. Furthermore, the support and damping system has a part that is rigidly joined with the end 13 of the bellows pipe 11 (see FIG. 1) and that may be formed, if desired, by the connection flange 16 (FIG. 1). In any case, a rod 59, having the same function as the rod 49 (see FIG. 2), is rigidly joined with the support part 52 and, on the rod 59, a bearer 54 is fixed between the two bearers 53 and 53'. For their part, the damping cushions 57, 58 are, on the one hand, placed between the bearer 53' and the bearer 54 and, on the other hand, between the bearer 54 and the bearer 53 and so placed within a sort of housing structure. The function of this sytem is, as a general point, the same as the system noted hereinbefore.

Figure 4:
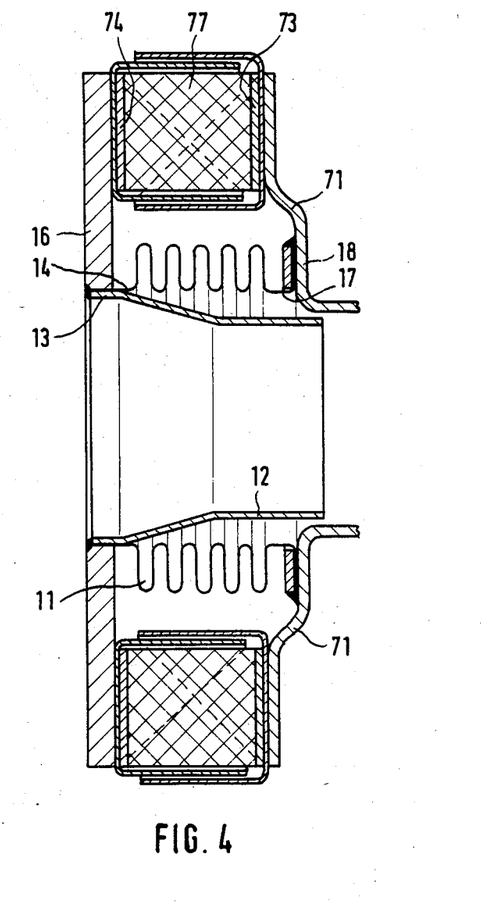
FIG. 4 is a cross sectional view of a still further embodiment of a coupling of the present invention for flexibly joining parts together.

A further example of the coupling of the invention for producing a flexible connection between an engine and an exhaust pipe system of a motor vehicle is shown in FIG. 4, wherein a tubular barrel 12 is placed within a bellows pipe 11 and the barrel 12 has its one end 13 fixed to the end 14 of the bellows pipe 11. A connection flange 16 is provided at the same end 14 of the bellows pipe 11. At the other end of the bellows pipe the same is joined to a pipe 18, that is designed to be joined up with the exhaust system of a motor vehicle and has two outwardly running flange parts 71. On the outer edges of the connection 16 of the flange part 71 there are again housing-like pockets with bearers 73 and 74 for a damping cushion 77. In this respect, the damping cushion 77 is not only loosely placed between the bearers 73 and 74 but fixedly joined thereto as well so that it is able to take up tension forces from the bearers 73 and 74 when the system is acted upon by pull forces. The bearers 74 and 73 are, for their part, fixedly joined with the connection flange 16 (functioning as a support part) or the flange part 71 of the pipe 18. This form of the invention as well makes possible a flexible or articulated connection between the engine and the exhaust system of a motor vehicle while, at the same time, ensuring a trouble-free and full sealing effect with respect to the gas flow from the engine to the exhaust system and furthermore offering a supporting joint and damping system with damping pads or cushions of pressed metal wire or metal wire compact made of, for example, nobel metal, that certainly make possible a decoupling effect between the oscillating or vibrating engine and the exhaust system while, at the same time, giving a good acoustic insulating effect putting an end to resonant vibrations.

Within the general framework or teaching of the present invention further developments are possible with the important point being that the damping members be made of cushion-like or pad-like structures of pressed wire, that is to say compressed wire compacts, with the pads or cushions being placed in pockets between at least two bearers rigidly joined with the ends of the corrugated pipe, and inasfar as there are only two bearers in the case of a system in which the elements thereof are axially aligned, the wire cushions or pads are fixedly joined to the same. If there are to be more bearers placed axially one after the other, the pads of wire cloth compact may be simply placed between the same. In place of having only one bellows pipe, it would be possible to have means with two parallel or twin bellows structures in the context of an exhaust system with twin pipes.

Figures 5A, 5B:
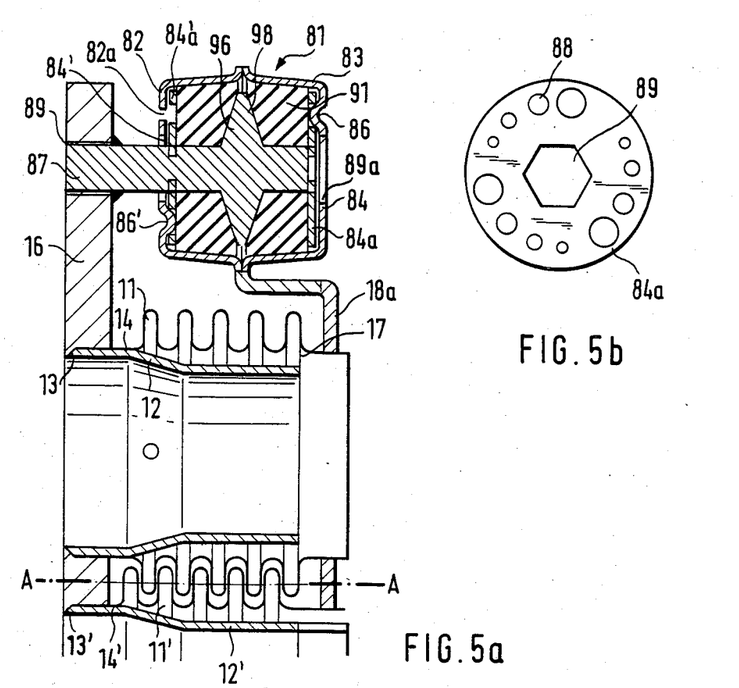

FIG. 5a is a longitudinal section through the compensator part of a twin pipe exhaust system, in the case of which only one half (the top one) thereof is shown while the other (lower) half is not shown to make the figure more straightforward and it will be possible to see the rest of the structure in the mind's eye by taking it that the one half of the structure is reflected at the line A—A onto the lower part, although the folds of the bellows pipe would be somewhat out of line. The same goes for FIGS. 7–10. The working example of the coupling of the invention to be seen in FIG. 5a, as a form of the invention, has a bellows pipe 11 and a further bellows pipe 11' placed next to it as a flexible articulation for the twin pipe exhaust system. In the bellows pipe 11 and pipe 11' there is, in each case, a barrel 12 and 12' that is joined at its one end along with the first end 14 of the bellows pipe 11 to a connection flange 16. The connection with the same function between the bellows pipe 11', the barrel 12' and the connection flange 16 is not shown in FIG. 5a. The other end 17 of the bellows pipe 11 and 11' as well as to be seen in the present working example fixedly joined to the specially formed flange 18a described more fully hereinbelow. In place of the specially formed flange 18a, it would be possible to have a straight or plain flange. Furthermore, it would be possible for the end 17 of the bellows pipes 11, 11' and the flange 18a to be fixedly joined to a short length of pipe (not shown), on which further parts of an exhaust system would then be fixed, this being done in the case of the working example directly on the end 17 of the bellows pipes 11 and 11'.

Furthermore, as a general point, the observations made in connection with FIG. 5a are true as well as for the further described structures of FIGS. 5a to 10b so that it is not necessary to give a full description of all of the details of such forms of the invention and, in fact, the further description is limited to the respects thereof in which they are different from the other structures.

It is generally true of all motor vehicle exhaust systems that there is a shortage of space, that is to say next to the exhaust pipes and, more particularly, the bellows pipes, with the amount of space that may be used for additional fittings such as damping means being very limited, at least in the one or the other direction normal to the longitudinal direction of the system. To make due with less space, in the embodiment of FIGS. 5a and 5b, the bellows pipes 11 and 11' are so placed that their wave or corrugation crests and valleys are out of align with each other so that the wave crests of the one bellows pipe are respectively accommodated in the wave valleys of the other bellows pipe, this given the useable effect that the overall breadth of the bellows pipes placed side by side is decreased.

A further point to be noted in connection with this form of the invention is that the support parts have their pockets, in which the damping pads are placed, "over" the bellows pipes 11 and 11' and not out of line and to the side thereof over a rigid pipe part. Two bell-like support parts 81, of which one is shown in FIG. 5a are fixedly joined to the specially formed flange 17a. The bell-like support part 81 is made up of two bell-like parts 82 and 83 that are joined together after putting the damping cushions 91 in place. The bell-like parts 82 and 83 have in their floors 84 and 84' a number (for example, three) of nose pieces 86 and 86' that are best placed symmetrically around the axis of the floor so as to be sticking into the inside space in the support part 81. In the space in the bell-like parts 82 and 83, there is, on the floor 84 and 84' of each part, a washer 84a and 84a', having around the axis and with the same radial spacing as the nose pieces 86 in the floor 84 and 84', a number of openings 88 placed one after the other with a changing diameter from one opening to the next. In the case of a system with three nose pieces 85 and 86', symmetrically spaced out in the floor 84 and 84' the washer 84a and 84a' will have three groups of symmetrical spaced out openings. The washer or disk 84a (see FIG. 5b) has, in the middle thereof, a polygonal opening 89, into which a tool may be placed, with the tool being put in through the opening 89a in the floor 84 so that the washer 84a may be turned. If the washer 84a is so placed that its largest openings are placed around and on the nose pieces 86, it will be fully resting on the floor 84. By adjustment of the angle thereof using the polygonal opening 89, the openings 88 with the smaller diameter will take up positions on the nose pieces 86 so that the washer 84a is moved further from the floor 84 and is pressed to a greater degree against the damping cushion 81 so that the stressing effect may be thereby increased. Because the bolt or pin 87 runs through the middle of the floor 84' of the bell-like part 82 and, for this reason, through the washer 84a as well, it is not possible to have any polygonal opening here. In place thereof the floor 84 has a long curved opening 8a, into which a tool may be placed and moved inwards as far as the washer 84a' so that adjustment thereof is possible. The middle support part 96 with a bearer washer 98 on the bolt 87 will be described more fully hereinbelow in connection with FIG. 6.

Figure 6:
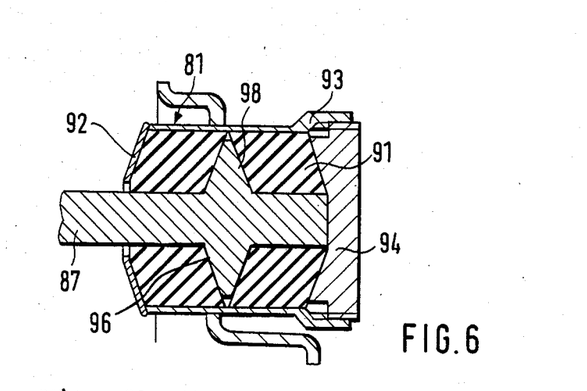
FIG. 6 is a cross sectional view of a still further embodiment of an adjustable system for pre-stressing or clamping effect.

The bell-like support part 81 of FIG. 6 has a plate-like floor 92 forming a bearer surface. The end, opposite to the floor 92 of the support part 81 has a threaded bushing 93 or is formed as such a bushing, and, into this bushing, a threaded disk 94 is screwed, the inner face of the same being plate-like like the plate-like floor 92 for forming a further bearer surface of the support part 81. The plate-like design is such that a middle part of the two bearer surfaces has a normal thereto that is parallel to the axis, whereas the edge parts of the bearer surfaces are coned in form and angled somewhat towards the inside of the bell-like support part 81. The bell-like support part 81 has a further support part 96 running therethrough, with the further support part 96 having a bolt or pin 87 running into the support part 81 and a bearer washer 98 inside the support part 81 in which it is fixed on the bolt 87. In this respect, the bearer washer 98 is generally in the form of the double frusto-conical structure, its conical faces running past the pin 87 being parallel to the sloping edge faces of the floor 92 and of the threaded plate 94. Because the support part 81 does not, as in FIG. 5a, have a cover fixedly joined with it in addition to the floor 84 joined to it, and in place thereof has a threaded washer 94, that may be screwed to different depths into the threaded sleeve, the damping cushions 91 may be adjusted as desired by the manufacturer in the first place and, if desired, later adjusted by the user.

A possible form of an adjusting system for the prestressing effect, different from the system with the threaded washer 94 is shown in FIG. 5a.

Figure 7A:
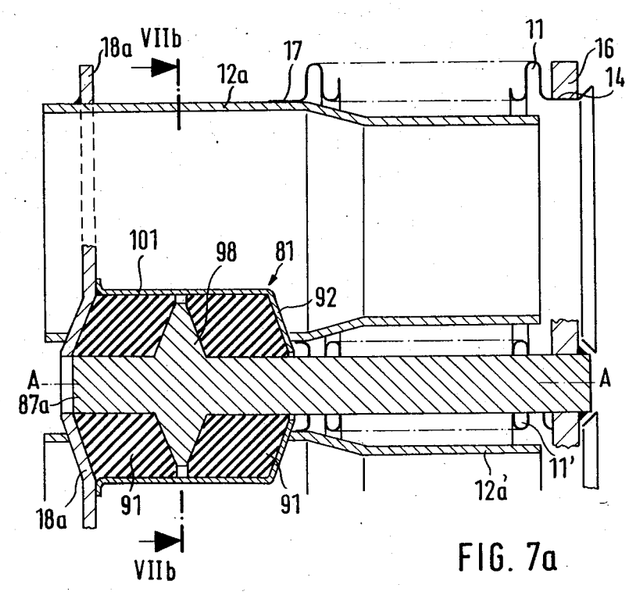
FIG. 7a is a partial schematic cross sectional view of another embodiment of a twin pipe system constructed in accordance with the present invention wherein the damping cushions are placed to a side between the pipes taken along the line VIIa-VIIa in FIG. 7b.
Figure 7B:
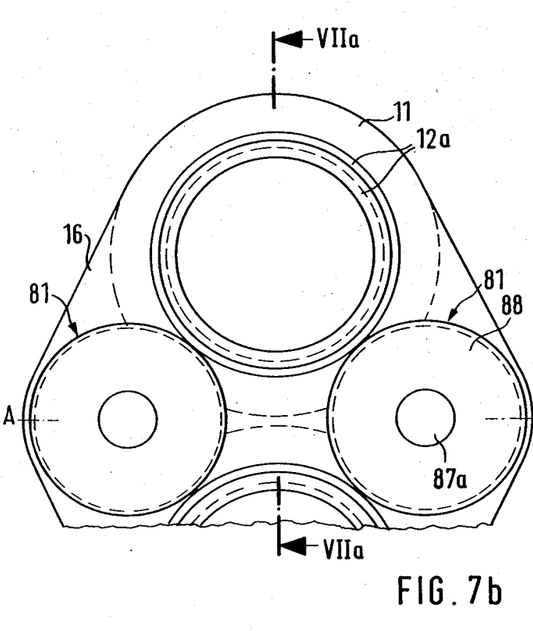

FIGS. 7a and 7b provide a further system in keeping with the invention, wherein there are two bellows pipes 11 and 11' placed side by side so that their ends 14 are fixed in position on a common end flange 16. A barrel 12a or 12a', respectively running into the bellows pipes 11 and 11', is not fixed to the flange 16 and, in fact, the other end 17 of the bellows pipe 11 (the same is true for the bellows pipe 11') is fixed on the pipe part 12a, the same running out of the bellows pipe 11 and having the formed flange 18a supported thereon at a certain distance from the end 17 of the bellows pipe 11.

In FIGS. 7a and 7b, a further possible form of the invention design is accomplished by making other changes in the structure of FIG. 5 in such a way that the bell- or pocket-like support parts 81 with the cushions 91 are not placed so that their middle or symmetry axes are in the same plane containing the middle axes of the two bellows pipes 11 and 11' placed side by side and, in fact, they are placed to the side between the bellows pipes 11 and 11', or better said between the parts, running out past the bellows pipes 11 and 11' of the barrels 12a and 12a'. The support parts 81 may, for this reason, be placed out of axial alignment in relation to the bellows pipes 11 and 11', see FIG. 7a. This being so, the support parts 81, as shown in FIG. 7b, may be forced further together than would be the case if they were truly aligned with the level of the bellows pipes and, for this reason, less space will be needed in a direction normal to the longitudinal direction of the system. The bell-like support parts are formed by a bell-like sleeve 101 having its top open edge fixedly joined to the specially formed flange 18a. The sleeve takes up part of a bolt 87a, whose part extending out of the sleeve is fixedly joined to the flange 16, more specially by welding it thereto, the bolt 87a supporting, in a way described hereinbefore, the bearer washer 98 or disk, on the two sides of which in the sleeve 101 the damping cushions 91 are positioned. In the present example of the invention as well, the floor 92 of the sleeve 101, the bearer faces of the bearer washer 98 and the part answering thereto of the specially formed flange 18a are designed in the form of frusto-conical faces. The damping cushions 91 are matched in form to the inner space form of the sleeve 101 formed in this case. The frusto-conical form makes it possible for not only axial forces to be taken up and damped or attenuated by the damping cushions but furthermore for the flexural motion or stress to be damped.

Figure 8A:
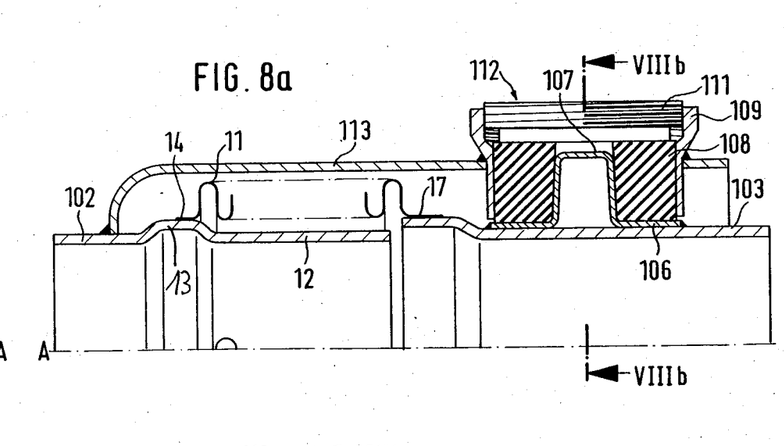
FIGS. 8a-8b are partial cross sectional views of yet another embodiment of the present invention, with the damping cushions being radially aligned in a single pipe system.
Figure 8B:
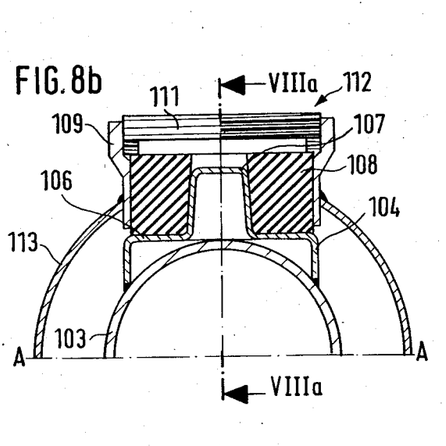

Whereas, in all the forms of the invention described hereinabove, the take up or absorption of the axial motion has been a more specially important guiding thought on which the different designs have been based and, for this reason, the support parts and damping parts have been placed so as to be more or less aligned in the axial direction and more specially the main components of the lines normal to the bearer faces are aligned with the axial direction, in FIGS. 8–10, forms of the invention are provided in which the system is radial, that is to say, the main components of the lines normal to the faces are generally aligned in an axial direction. These structures are designed more specially to take up angular or flexural motions and stresses. Whereas, the above described forms of the invention were positioned at the point at which the exhaust pipe system was joined up with the engine block, the structures of which an account is now to be given are designed for parts of the exhaust pipe system that are some distance from the engine block. In FIGS. 8a and 8b, a single pipe system is proposed wherein the end 14 of the bellows pipe 11 is joined with a piece 12 of pipe running out therefrom, which pipe has a connection end 102 running out from the bellows pipe 11. A tubular connection end 103 is fixed to the end 17 of the bellows pipe 11. Placed diametrally opposite there are two U-shaped parts 104 on the connection end 103, such parts 104 being placed partly around the connection end 103 and only one of which is shown in FIG. 8a. The U-shaped parts 104 are designed with a generally cylindrical head in the middle thereof. In place of having a specially formed structure it would furthermore be possible to have a straight middle part 106 of the U-shaped parts fixed radially to a piece of pipe. The U-shaped part 104 takes the form of a supporting part for a damping cushion 108, that has a threaded sleeve 109 around it, into which a threaded washer 11 is screwed from the side opposite to the middle part 106 of the U-shaped part 104. The threaded sleeve 109 and the threaded washer 11 are responsible for forming a second support part 112. The support part 112 is fixed to the connection end, that is joined with the bellows pipe 11, by way of an S-shaped pipe 113. Because of the design of the support part 112 with a threaded washer, it is possible for the stressing force of the damping cushion 108, placed in a support part 112, to be adjusted on manufacturing thereof and latter by the user. The structure shown in FIG. 8a makes it possible to effect relatively small changes in the angles of the two connection ends 102 and 103. Whereas, in FIG. 8a there are two damping members 112 placed diametrally opposite each other, a useful effect may be produced by having three or even more damping members, designed in the form of pocket-like support parts, evenly spaced around the axis of the connection end 103.

Figure 9A:
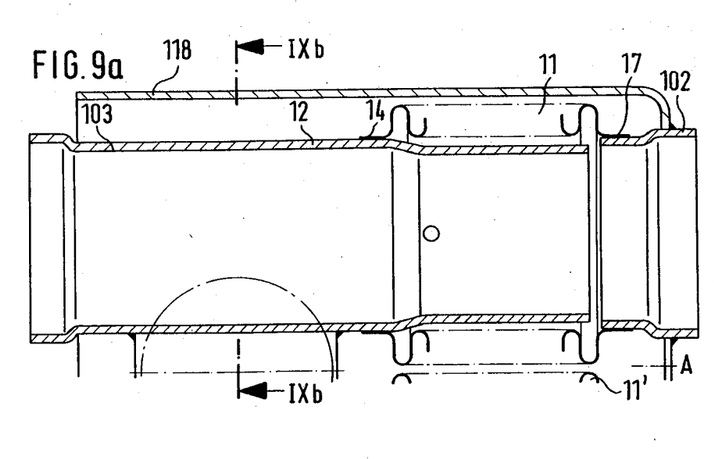
FIGS. 9a-9b are cross sectional views of a further embodiment of the system of FIGS. 8a-8b for use with a twin pipe unit.
Figure 9B:
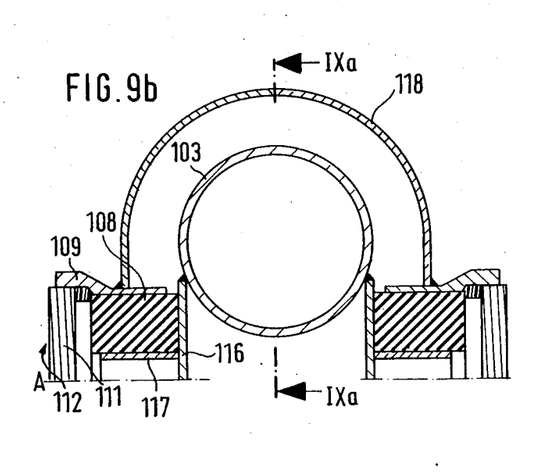

In the construction of FIGS. 9a and 9b it is a question of a decoupling structure for a twin exhaust pipe system. In this design, the two connection ends 103 are joined by way of straight bridge pieces 116 that are placed side by side. On the bridge pieces 116 cylindrical pieces 117 of pipe are welded so that they are normal to the plane of connection of the two faces of the connection ends 103. The pieces 117 of the pipe have threaded sleeves 109 around them having threaded washers 111 therein. The threaded sleeve 109 is fixed to a supporting part 118, the same being placed around the bellows pipes 11 and 11' and furthermore the connection ends 103 and 102, and being joined with the connection ends 102. With this design it is possible for changes in angle or angular motion out of the plane formed by two axes of the bellows pipes 11 and 11' to be damped. To take up axial and angular motion in a direction normal to the direction of motion, the threaded sleeves and the damping cushions are to be designed to that they are not cylindrically symmetrical in a way noted in connection with the above described forms of the invention and/or, for example, damping elements may additionally be placed on the two opposite sides of the connection ends 103.

Figure 10A:
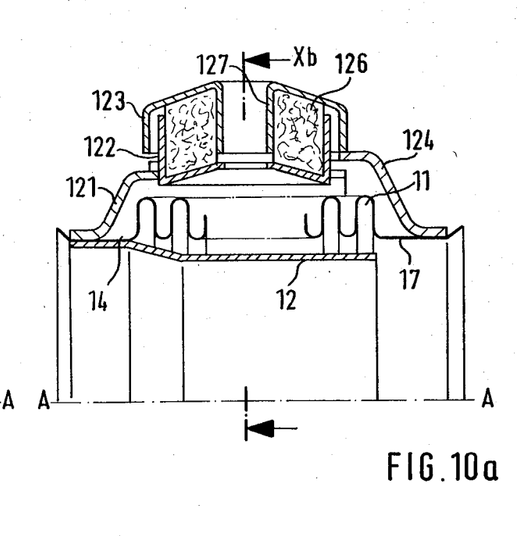
FIGS. 10a-10b are views of another embodiment of the present invention in which the damping cushions are placed radially and placed over a compensator.
Figure 10B:
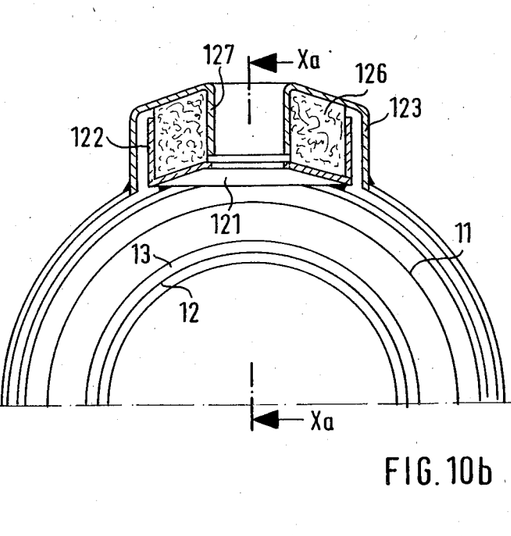

While in the working examples of the invention so far described, the damping or shock-absorbing cushions have been radially symmetrical, even although their end faces have been at a slope and not at a right angle to the outer or peripheral faces, in FIGS. 10a and 10b, a damping cushion is provided that is not radially symmetrical and which may, generally speaking, be used in the previously described forms of the invention. On the end 14, that is joined with the piece 12 of pipe, of the bellows pipe 11 in each case an embossed part 121 is fixed on the sides of the pipe part 12, with the embossed part 121 in the present form of the invention sticking out somewhat from the end 14 of the bellows pipe 11 like a letter S, the outwardly running end having a pocket-like support part 122 fixed thereto. The support part 122 is overlapped by a support part 123 and is fixed to a further embossed part 124 that is S-shaped in cross section, with the part 124 being supported on the other end of the bellows pipe 11. Within the support part 122 there is a damping or shock absorbing pad 126 with a hole through a middle thereof to take up a head 127 of the support part 123. In this way the damping cushion will be seen to be completely within the pocket-like support parts 122 and 123. As apparent from a comparison between the FIGS. 10a and 10b from the section along planes that are normal to each other, in these two directions not only the inner but furthermore the outer diameter of the damping part 126 are different. The damping cushion 126 may be so designed that, in a plane of the section taken normal to the figure, it would have a rectangular, elliptical, or oval form and, at any rate, not be radially symmetrical. In addition to this and furthermore in addition to the fact that the damping cushion 126 is placed over the bellows pipe 11 and not out of line in relation thereto, in this case the end faces of the damping cushion are not normal in relation to the outer faces but at a slope in relation thereto. In addition to the flexual motion that is mainly taken up by this form of the invention, it will furthermore be possible for axial motion and crossways motion to be taken up because of the design's not being radially symmetrical, such motion taking effect in the structure of FIGS. 10a, 10b on the damping cushion 126 in a direction normal to the plane of FIGS. 10a, 10b, motion in the case of such a damping cushion, if made with a round plan or outline, only causing undamped relative twisting motion, at least if the damping cushions were not fixedly joined to the complementary threaded sleeves.

From the detailed description give so far it will be seen, on the one hand, that the bearers and the damping cushions may be placed in different ways and, on the other hand, may be made with many different forms. Moreover, more than two damping members may be placed one after the other and the details of design of the different forms of the invention may be used with details from other forms thereof inasfar as this would make sense technically having in mind the amount of space that may be used. More specially, the details of the invention noted in the specification and the claims, and to be seen in the figures, may be used separately or combined together to put into effect the general teaching of the invention.

We claim:

1. A coupling for producing an articulated connection between tubular parts for conducting exhaust gases from a motor vehicle, of the coupling comprising at least one flexible conducting part insertable between the tubular parts which are thereby connected, said flexible conducting part having connecting ends permanently connected with the respective ends of the tubular parts which are thereby connected, support parts disposed outside a path of the exhaust gases and connected with ends of said flexible conducting part, and damping members placed outside the path of the exhaust gases and connected with the support parts, said support parts overlapping each other and forming housing-like pocket which moves relative to each other, said damping members being made of compressed metal wire fabric pressed into the housing-like pockets and retained therein under pressure.

2. The coupling as claimed in claim 1, wherein a plurality of support parts are provided, said support parts being rigidly joined with the two ends of the flexible conducting part.

3. The coupling as claimed in claim 1, wherein the said support parts have end bearer faces for said damping members such that normals to said bearer faces are substantially aligned in an axial direction, with said end faces forming supporting parts on the respective ends the flexible conducting part.

4. The coupling as claimed in claim 1, wherein said support parts have end bearer faces for said damping members such that normals to said bearer faces are substantially radial with respect to the axial direction, with said end faces forming supporting parts on the respective ends of said flexible conducting part.

5. The coupling as claimed in claim 3, wherein said end faces are angled from a middle portion thereof to edge portions thereof.

6. The coupling as claimed in claim 4 wherein said end faces are angled from a middle portion thereof to edge portions thereof.

7. The coupling as claimed in claim 1, wherein said damping members are pre-pressed to match the form of the housing-like pockets.

8. The coupling as claimed im claim 1, wherein said damping members have a nonradially symmetrical form.

9. The coupling as claimed in claim 1, wherein the damping members made of compressed metal wire fabric are fixedly joined to the support parts.

10. A coupling for producing an articulated joint between at least one pipe and an exhaust system of a motor vehicle, the coupling comprising at least one flexible duct, support parts joined with ends of said flexible duct, and damping members placed outside the path of exhaust gases and joined with the support parts, said support parts forming housing-like pockets which moves relative to each other, said damping members being made of a compressed metal wire fabric pressed into the housing-like pockets and retained therein under pressure, and wherein a housing-like pocket for one of said damping members includes an end wall in the form of a ring, a rod extending substantially through a middle of said damping member and freely extending through at least one further support part, said damping members with a middle opening being seated on the rod and on a supporting part ridgedly joined with said rod.

11. The coupling as claimed in claim 1 wherein at least one supporting part with a radially extending bent portion having end faces forming bearer faces.

12. The coupling as claimed in claim 3, comprising a connection piece joined with said flexible conducting part, and wherein at least some of said bearer faces are formed by outwardly formed portions of said connection piece.

13. The coupling as claimed in claim 1, wherein said damping members are placed evenly spaced around the axis of said flexible duct and outside thereof.

14. A coupling for producing an articulated joint between at least one pipe and an exhaust system of a motor vehicle, the coupling comprising at least one flexible duct, support parts joined with ends of said flexible duct, and damping members placed outside the path of exhaust gases and joined with the support parts, said support parts forming housing-like pockets which moves relative to each other, said damping members being made of a compressed metal wire fabric pressed into the housing-like pockets and retained therein under pressure, and wherein said damping members are placed radially over the flexible duct.

15. The coupling as claimed in claim 1, wherein the damping members are placed axially out of line next to the flexible duct.

16. The coupling as claimed in claim 15, further comprising a bridge piece of a support part for one damping member, said bridge piece being placed on one end of the flexible conducting part, a further support part is seated on a part joined with the other end of the flexible conducting part, and a pipe extending beyond the flexible conducting part, said pipe forming said further support part.

17. The coupling as claimed in claim 1, comprising means for adjustment of a clamping force acting by way of said support parts on the damping members.

18. A coupling for producing an articulated joint between at least one pipe part of an exhaust system of a motor vehicle, the coupling comprising at least one flexible duct, support parts joined with ends of said flexible duct, and damping members placed outside the duct and joined with the support parts, said support parts being overlapped with each other forming housing-like pockets and being adapted to be moved relative to each other, said damping members being made of a compressed wire, means for adjusting a clamping force acting by way of the support parts on the damping members, and a threaded sleeve or bushing and a threaded washer screwed thereinto for forming a bearing face for one of said damping members.

19. A coupling for producing an articulated joint between at least one pipe and an exhaust system of a motor vehicle, the coupling comprising at least one flexible duct, support parts joined with ends of said flexible duct, and damping members placed outside the path of exhaust gases and joined with the support parts, said support parts forming housing-like pockets which moves relative to each other, said damping members being made of a compressed metal wire fabric pressed into the housing-like pockets and retained therein under pressure, and means for enabling an adjustment of a clamping force acting by way of said support parts on the damping members, and wherein at least one end face of a support part, nose pieces are symmetrically placed about the axis of said support part, said nose pieces extending into the space inside the support part, said coupling further comprising a washer with openings therein of different size and which may be turned relative to the nose pieces about a common axis so that the axial position of the washer may be changed in keeping with which openings are placed over said nose pieces and wherein means are provided for adjusting said washer from the outside.

20. The coupling as claimed in claim 1, wherein each of said support parts is rigidly joined with one end of the flexible duct.

* * * * *